US012663680B2

(12) United States Patent
Zhu et al.

(10) Patent No.: US 12,663,680 B2
(45) Date of Patent: Jun. 23, 2026

(54) LIQUID CRYSTAL GRATING, DISPLAY DEVICE AND CONTROL METHOD FOR LIQUID CRYSTAL GRATING

(71) Applicants: Beijing BOE Display Technology Co., Ltd., Beijing (CN); BOE Technology Group Co., Ltd., Beijing (CN)

(72) Inventors: Jinye Zhu, Beijing (CN); Ru Zhou, Beijing (CN); Xiaoqing Peng, Beijing (CN); Shiming Shang, Beijing (CN); Hailin Xue, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 55 days.

(21) Appl. No.: 18/769,439

(22) Filed: Jul. 11, 2024

(65) Prior Publication Data

US 2024/0369886 A1 Nov. 7, 2024

Related U.S. Application Data

(63) Continuation of application No. PCT/CN2023/078210, filed on Feb. 24, 2023.

(51) Int. Cl.
*G02F 1/1345* (2006.01)
*G02F 1/1362* (2006.01)

(52) U.S. Cl.
CPC .... *G02F 1/13452* (2013.01); *G02F 1/136209* (2013.01); *G02F 1/136286* (2013.01)

(58) Field of Classification Search
CPC ........... G02F 1/13452; G02F 1/136209; G02F 1/136286
See application file for complete search history.

(56) References Cited

U.S. PATENT DOCUMENTS

2018/0217443 A1* 8/2018 Wang ...................... G02F 1/137
2019/0335163 A1* 10/2019 Yang ..................... G02B 30/31

FOREIGN PATENT DOCUMENTS

| CN | 102109706 A | 6/2011 |
|---|---|---|
| CN | 102955186 A | 3/2013 |
| CN | 106918956 A | 7/2017 |
| CN | 108572489 A | 9/2018 |
| CN | 209265093 U | 8/2019 |
| WO | 2022104575 A1 | 5/2022 |

* cited by examiner

*Primary Examiner* — David Y Chung
(74) *Attorney, Agent, or Firm* — IPro, PLLC

(57) ABSTRACT

A liquid crystal grating includes: a first grating period and a second grating period arranged along a first direction, where a quantity of second electrodes in the second grating period is less than a quantity of first electrodes in the first grating period; a first driving structure, electrically connected with the first electrodes, and controlling the first grating period to form a first light-shielding region and a first light-transmitting region by applying voltages to the first electrodes; and a second driving structure, electrically connected with the second electrodes, and controlling the second grating period to form a second light-shielding region and a second light-transmitting region by applying voltages to the second electrodes, where a width of the second light-transmitting region in the first direction is less than a width of the first light-transmitting region in the first direction.

13 Claims, 4 Drawing Sheets

S1(S)                    S2(S)

12
14
13      } 1
11
3
2

-1280        -353    0              1280

645              1925            3205

Left eye      Right eye

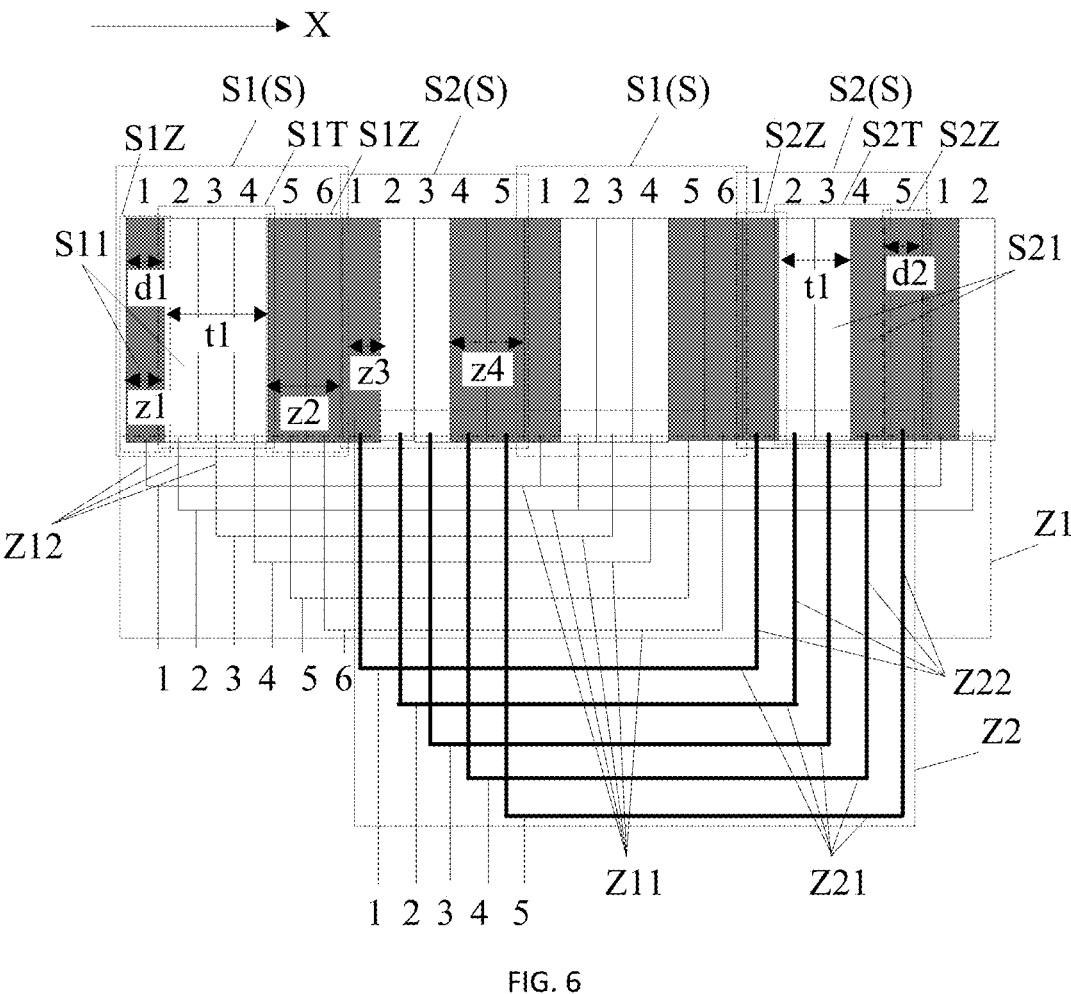

FIG. 6

| | S100 |
|---|---|
| Applying, by the first driving structure, the voltage to the first electrodes in the first grating period, so that the first grating period forms the first light-shielding region and the first light-transmitting region | |

| | S200 |
|---|---|
| Applying, by the second driving structure, the voltages to the second electrodes in the second grating period, so that the second grating period forms the second light-shielding region and the second light-transmitting region, and the width of the second light-transmitting region in the first direction is less than the width of the first light-transmitting region in the first direction | |

FIG. 7

LIQUID CRYSTAL GRATING, DISPLAY DEVICE AND CONTROL METHOD FOR LIQUID CRYSTAL GRATING

CROSS-REFERENCE TO RELATED APPLICATIONS

This application is a continuation application of International Application No. PCT/CN2023/078210, filed on Feb. 24, 2023, which is hereby incorporated by reference in its entirety.

TECHNICAL FIELD

The present disclosure relates to the field of semiconductor technology, and in particular to a liquid crystal grating, a display device and a control method for the liquid crystal grating.

BACKGROUND

In recent years, naked-eye 3D display technology has developed rapidly. Liquid crystal grating-type naked-eye 3D technology has a simple manufacturing process and better 3D effects, and has become an important direction of current naked-eye 3D technology.

SUMMARY

Embodiments of the present disclosure provide a liquid crystal grating, a display device, and a control method for the liquid crystal grating. The liquid crystal grating includes: a plurality of grating periods, including a first grating period and a second grating period arranged along a first direction, where the first grating period includes a plurality of first electrodes arranged along the first direction, the second grating period includes a plurality of second electrodes arranged along the first direction, where a quantity of the second electrodes in the second grating period is less than a quantity of the first electrodes in the first grating period;

a first driving structure, electrically connected with the first electrodes, and controlling the first grating period to form a first light-shielding region and a first light-transmitting region by applying voltages to the first electrodes; and a second driving structure, electrically connected with the second electrodes, and controlling the second grating period to form a second light-shielding region and a second light-transmitting region by applying voltages to the second electrodes, where a width of the second light-transmitting region in the first direction is less than a width of the first light-transmitting region in the first direction.

In a possible implementation, each of the grating periods includes a first substrate and a second substrate arranged opposite to each other, and a liquid crystal layer between the first substrate and the second substrate, where the second electrode is located on the first substrate; a width of the first electrode in the first direction is equal to a width of the second electrode in the first direction;

an opening deviation of the second light-transmitting region is an integer multiple of a center-to-center spacing between adjacent second electrodes.

In a possible implementation, the opening deviation B satisfies a following relationship:

$$B = (x1' - x') - (x1 - x); \text{ where, } x1' \text{ satisfies: } \tan\theta 1' = x1'/H;$$

$$x' \text{ satisfies: } \tan\theta' = x'/H; x1 \text{ satisfies: } \tan\theta 1 = x1/h;$$

$$x \text{ satisfies: } \tan\theta = x/h;$$

$\theta'$ represents an incident angle when light enters a human eye through a left edge of the light-transmitting region of the m-th grating period, $\theta$ represents a refractive angle when light enters a human eye through the left edge of the light-transmitting region of the m-th grating period, $\theta 1'$ represents an incident angle when light enters a human eye through a right edge of the light-transmitting region of the m-th grating period, $\theta 1$ represents an refractive angle when light enters a human eye through the right edge of the light-transmitting region of the m-th grating period, h represents a distance value between a first liquid crystal grating and a display panel, and H represents a distance value between a second liquid crystal grating and the display panel.

In a possible implementation, the quantity of the first electrodes in the first grating period and the quantity of the second electrodes in the second grating period have a difference of 1.

In a possible implementation, a width of the first light-shielding region in the first direction is same as a width of the second light-shielding region in the first direction.

In a possible implementation, the first driving structure includes: a plurality of first driving lines extending along the first direction, and first connecting lines electrically connected with the first electrodes in the first grating period in one-to-one correspondence; the first electrodes at same positions in different first grating periods are connected with a same first driving line through the first connecting lines, and the first electrodes at different positions in a same first grating period are electrically connected with different first driving lines through the first connecting lines.

In a possible implementation, the second driving structure includes: a plurality of second driving lines extending along the first direction, and second connecting lines electrically connected with the second electrodes in the second grating period in one-to-one correspondence; the second electrodes at same positions in the second grating periods are connected with a same second driving line through the second connecting lines, and the second electrodes at different positions in the second grating period are connected with different second driving lines through the second connecting lines.

In a possible implementation, the second connecting lines extend along a direction perpendicular to the first direction.

In a possible implementation, the second connecting lines are arranged on a same layer as the first connecting lines, and the second driving lines are arranged on a same layer as the first driving lines.

In a possible implementation, the second connecting lines are located on a different layer from the second driving lines.

In a possible implementation, the second driving lines are located on a side of the first driving lines away from the second electrodes.

In a possible implementation, the liquid crystal grating has a symmetry axis perpendicular to the first direction, and two grating regions distributed on both sides of the symmetry axis; and the liquid crystal grating has two second driving structures that control different grating regions respectively.

Embodiments of the present disclosure further provide a display device, including the liquid crystal grating according to embodiments of the present disclosure, and further including a display panel on a light-emitting side of the liquid crystal grating.

Embodiments of the present disclosure further provide a control method for controlling the liquid crystal grating according to embodiments of the present disclosure, including:

applying, by the first driving structure, the voltages to the first electrodes in the first grating period, so that the first grating period forms the first light-shielding region and the first light-transmitting region; and applying, by the second driving structure, the voltages to the second electrodes in the second grating period, so that the second grating period forms the second light-shielding region and the second light-transmitting region, and the width of the second light-transmitting region in the first direction is less than the width of the first light-transmitting region in the first direction.

BRIEF DESCRIPTION OF FIGURES

FIG. 6 is a second schematic diagram of the layout of a liquid crystal grating according to embodiments of the present disclosure.

FIG. 7 is a schematic diagram of the control of a liquid crystal grating according to embodiments of the present disclosure.

DETAILED DESCRIPTION

Figure 1:
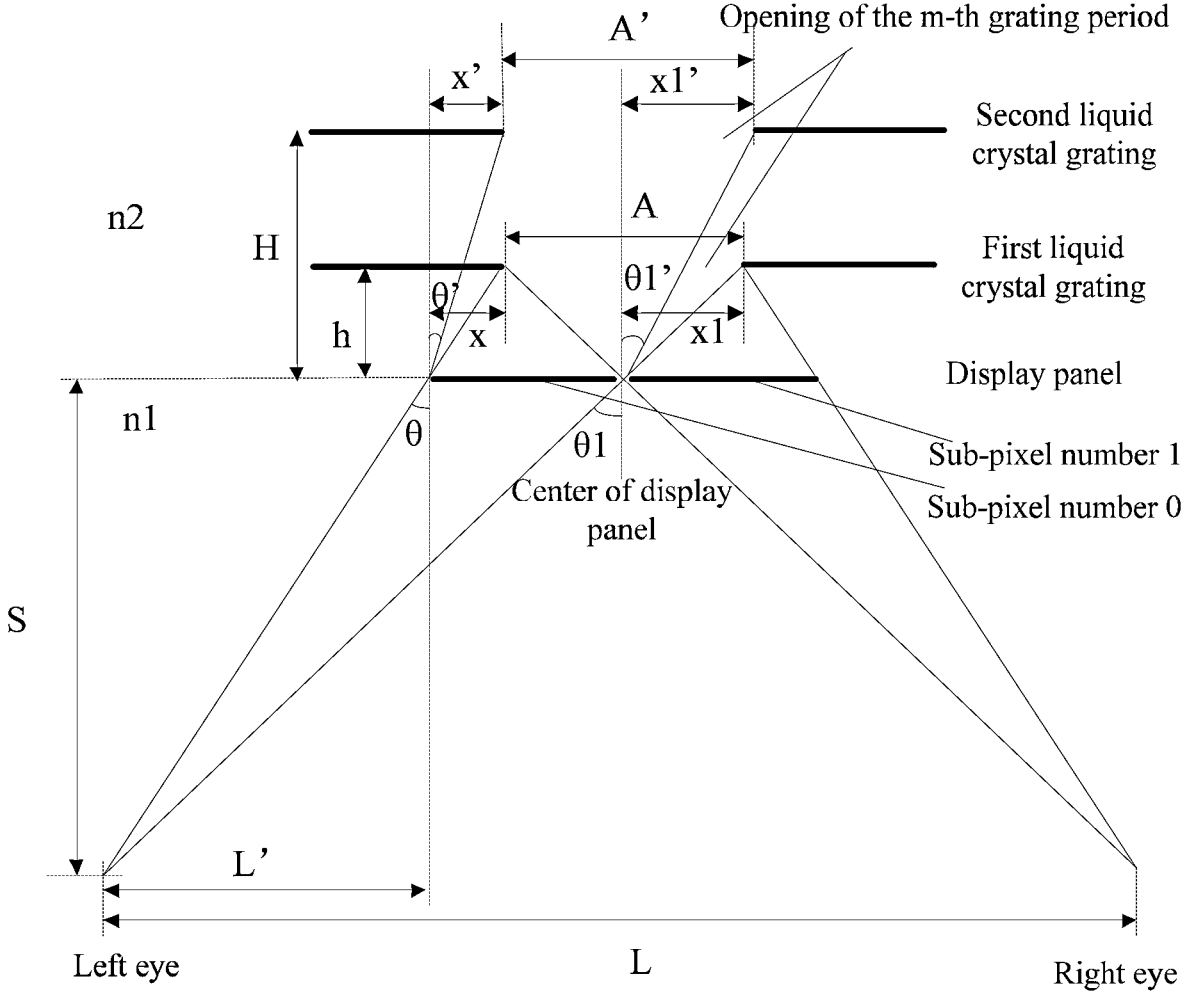
FIG. 1 is a schematic diagram of the principle of an opening deviation of a liquid crystal grating according to embodiments of the present disclosure.

In order to make the purpose, technical solutions and advantages of embodiments of the present disclosure clearer, the technical solutions of embodiments of the present disclosure will be clearly and completely described below in conjunction with the drawings of embodiments of the present disclosure. Apparently, the described embodiments are some of embodiments of the present disclosure, not all of them. Based on the described embodiments of the present disclosure, all other embodiments obtained by those skilled in the art without creative effort fall within the claimed scope of the present disclosure.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Comprising" or "including" and similar words mean that the elements or items appearing before the word include the elements or items listed after the word and their equivalents, without excluding other elements or items. Words such as "connected" or "coupled" are not limited to physical or mechanical connections, but may include electrical connections, whether direct or indirect. "Up", "down", "left", "right" and so on are only used to indicate the relative positional relationship. When the absolute position of the described object changes, the relative positional relationship may also change accordingly.

"About" or "approximately the same" as used herein is inclusive of the stated value and means within an acceptable range of deviation for the particular value as determined by those skilled in the art, considering the measurement in question and the error associated with measurement of the particular quantity (i.e., the limitations of the measurement system). For example, "approximately the same" can mean within one or more standard deviations, or within +30%, 20%, 10%, 5% of the stated value.

In the drawings, thicknesses of layers, films, panels and regions are enlarged for clarity. Exemplary embodiments are described herein with reference to cross section diagrams that are schematic diagrams of idealized embodiments. As such, variations from the shapes of the diagrams as a result, for example, of manufacturing techniques and/or tolerances, are to be expected. Thus, embodiments described herein should not be construed as being limited to the particular shapes of regions as illustrated herein but including deviations in shapes that result, for example, from manufacturing. For example, a region illustrated or described as flat may, typically, have rough and/or nonlinear features. Moreover, sharp angles that are illustrated may be rounded. Thus, the regions illustrated in the drawings are schematic in nature and their shapes are not intended to illustrate the precise shape of a region and are not intended to limit the scope of the present claims.

In order to keep the following description of embodiments of the present disclosure clear and concise, in the present disclosure, detailed descriptions of known functions and known components are omitted.

In the current liquid crystal grating type naked-eye 3D display, due to a refractive medium (not an air layer) between a display panel and a liquid crystal grating, there is inevitably an accumulated edge deviation of the liquid crystal grating opening, resulting in a gradual increase in crosstalk from the center to the edge of a screen.

Figure 2:
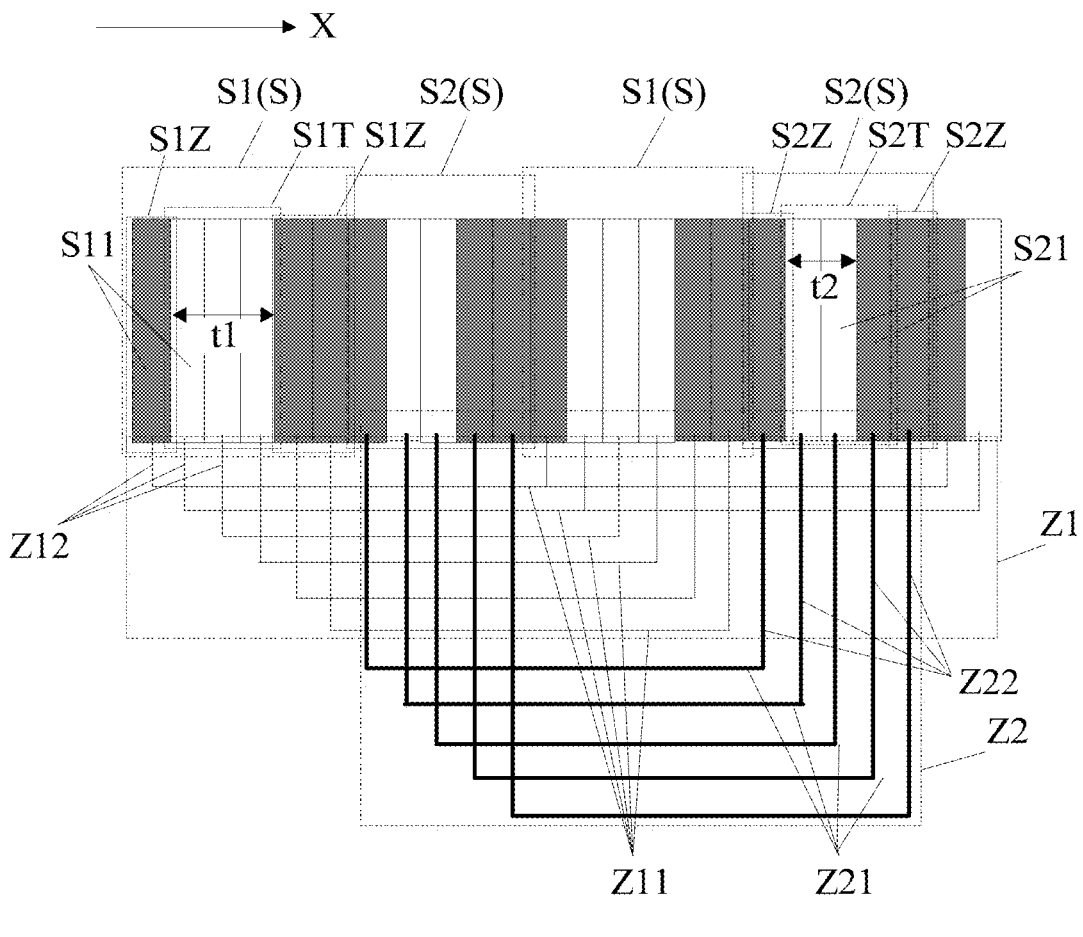
FIG. 2 is a first schematic diagram of the layout of a liquid crystal grating according to embodiments of the present disclosure.

In view of this, referring to FIG. 2, embodiments of the present disclosure provide a liquid crystal grating, including:

a plurality of grating periods S, including a first grating period S1 and a second grating period S2 arranged along a first direction X, where the first grating period S1 includes a plurality of first electrodes S11 arranged along the first direction X, the second grating period S2 includes a plurality of second electrodes S21 arranged along the first direction X, where a quantity of the second electrodes S21 in the second grating period S2 is less than a quantity of the first electrodes S11 in the first grating period S1;

a first driving structure Z1, electrically connected with the first electrodes S11, and controlling the first grating period S1 to form a first light-shielding region S1Z and a first light-transmitting region S1T by applying voltages to the first electrodes S11; and a second driving structure Z2, electrically connected with the second electrodes S21, and controlling the second grating period S2 to form a second light-shielding region S2Z and a second light-transmitting region S2T by applying voltages to the second electrodes S21, where a width t2 of the second light-transmitting region S2T in the first direction X is less than a width t1 of the first light-transmitting region S1T in the first direction X. As shown in FIG. 2, one strip may represent one first electrode S11 (or one second electrode S21), the strip being gray may represent that the first electrode S11 (or the second electrode S21) is in a light-shielding state; the strip being white may represent that the first electrode S11 (or the second electrode S21) is in a light-transmitting state. The first light-transmitting region S1T is an opening of the first grating period S1, and the second light-transmitting region S2T is an opening of the second grating period S2.

In embodiments of the present disclosure, the liquid crystal grating S includes a plurality of first grating periods S1, a first driving structure Z1 that drives the first grating periods S1, a plurality of second grating periods S2, and a second driving structure Z2 that drives the second grating periods S2. The quantity of the second electrodes S21 in the second grating period S2 is less than the quantity of the first electrodes S11 in the first grating period S1. By making a width t2 of the second light-transmitting region S2T in the first direction X less than a width t1 of the first light-transmitting region S1T in the first direction X, that is, narrowing the opening of the second grating period S2, an opening deviation at the second grating period S2 of the liquid crystal grating is thus reduced, the opening of the second grating period S2 is compensated, and an accumulated edge deviation of the opening of the liquid crystal grating is reduced, relieving the problem of a gradual increase in crosstalk from the center to the edge of the grating.

It should be noted that, FIG. 2 is only a schematic illustration based on an example where the first grating period S1 includes six first electrodes S11, the second grating period S2 includes five second electrodes S21, the first electrodes S11 and the second electrodes S21 are closely arranged, and the first grating periods S1 and the second grating periods S2 are alternately arranged. However, embodiments of the present disclosure are not limited to this. In a specific implementation, the first grating period S1 may include a larger quantity of first electrodes S11, the second grating period S2 may include a larger quantity of second electrodes S21, the first electrode S11 and the second electrode S21 may have a gap therebetween, and the first grating periods S1 and the second grating periods S2 may be not alternately arranged. For example, along the first direction X, a plurality of first grating periods S1 can be arranged first, then one second grating period S2 is arranged, then a plurality of first grating periods S1 are arranged, and then one second grating period S2 is arranged, and so on.

Figure 3:
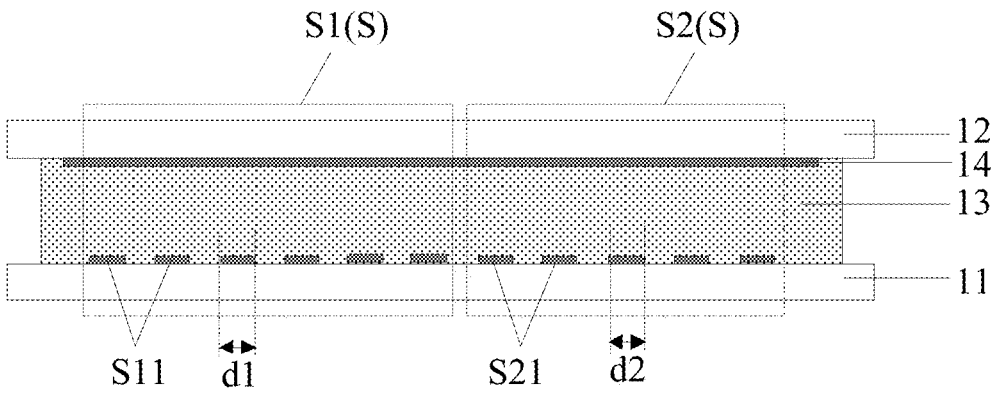
FIG. 3 is a schematic cross-sectional diagram of a liquid crystal grating according to embodiments of the present disclosure.
Figure 4:
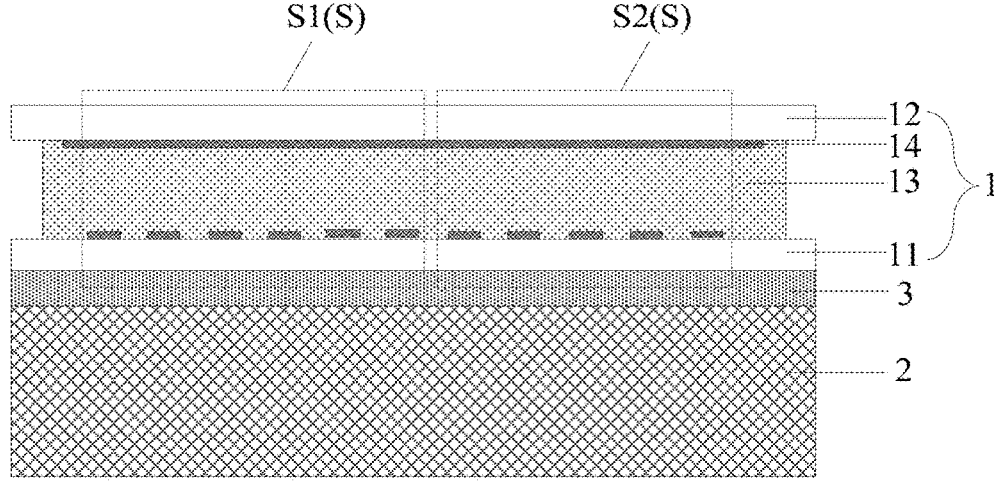
FIG. 4 is a schematic diagram of a display device according to embodiments of the present disclosure.

Referring to FIGS. 3 and 4, each of the grating periods S includes a first substrate 11 and a second substrate 12 arranged opposite to each other, and a liquid crystal layer 13 between the first substrate 11 and the second substrate 13, where the second electrode may be located on the first substrate 11; a width d1 of the first electrode S11 in the first direction X is equal to a width d2 of the second electrode S21 in the first direction X. As shown in FIGS. 1 and 4, when the liquid crystal grating 1 is applied to a 3D display device, a display panel 2 may be disposed on a side of the liquid crystal grating 1 facing human eyes, and a backlight module may be disposed on a side of the liquid crystal grating 1 away from human eyes. The liquid crystal grating 1 may be bonded to the display panel 2 via an adhesive layer 3. Light emitted from the backlight module passes through an opening of the liquid crystal grating 1 to reach the display panel 2 (for example, to enter a color film layer in the display panel 2), and then enters the human eyes. The left eye and the right eye respectively observe different display contents at different positions of the display panel 2, realizing 3D display.

As shown in FIGS. 1 and 4, when the light passes through the opening of the liquid crystal grating 1 to reach the display panel 2 (for example, to enter the color film layer in the display panel 2), and then enters a human eye, the path is not an air layer, instead, the light at least needs to pass through a plurality of medium film layers such as the first substrate 11 of the liquid crystal grating 1, the adhesive layer 3, and an upper substrate of the display panel (not shown in FIG. 4). However, in the current 3D display device, this part of light propagation path is generally treated as an air layer, while in fact, due to the presence of the plurality of medium film layers, the opening of the liquid crystal grating may be deviated, and the deviation may gradually increase from the center to the edge of the liquid crystal grating, giving rise to a problem of image crosstalk in the 3D display device being viewed.

Referring to FIG. 1, which is a schematic diagram of the principle of an opening deviation of a liquid crystal grating, the first liquid crystal grating represents a propagation path of light when the film layer between the display panel and the liquid crystal layer of the liquid crystal grating is ignored, i.e., a transmission of light when there is an air layer between the display panel and the liquid crystal layer of the liquid crystal grating; the second liquid crystal grating represents a propagation path of light when the film layer between the display panel and the liquid crystal layer of the liquid crystal grating is taken into consideration, i.e., a transmission of light when there is a refractive medium layer between the display panel and the liquid crystal layer of the liquid crystal grating. Based on an example of a propagation path in which the light enters the left eye through openings of the m-th grating periods of the first liquid crystal grating and the second liquid crystal grating, following calculations and explanations are made.

As shown in FIG. 1, S is a viewing distance, h is a placement height of the first liquid crystal grating, H is a placement height of the second liquid crystal grating, L is a distance between the two eyes, and L' is a distance from the left eye to the center of the liquid crystal grating;

L'=L/2+(n−1)n*sub-pixel pitch, where n represents a sub-pixel number, and the sub-pixel number n is 0, 1, 2 . . . n from the middlemost grating period to the right, and 0, −1, −2 . . . from the middlemost grating period to the left;

$\theta$ can be obtained according to $\tan\theta = L'/S$;

$\theta'$ can be obtained according to a refractive index formula: $n1*\sin\theta = n2*\sin\theta'$; where n1 represents a refractive index of air, n2 represents a refractive index of an equivalent medium layer, where the equivalent medium layer is a film layer obtained after equivalence of a film layer between the display panel and the liquid crystal layer of the liquid crystal grating, and the film layer between the display panel and the liquid crystal layer of the liquid crystal grating may be regarded as an equivalent medium layer with a refractive index n2 of 1.5;

$$\text{according to } \tan\theta = x/h; \tan\theta' = x'/H;$$

values of x and x' are obtained, that is, $x=\tan\theta*h$, $x'=\tan\theta'*H$;

likewise, $x1=\tan\theta1*h$, $x'=\tan\theta1'*H$ can be obtained;

the n-th grating period in the first liquid crystal grating has an opening A=sub-pixel pitch+x1−x;

the n-th grating period in the second liquid crystal grating has an opening A'=sub-pixel pitch+x1'−x'.

Where θ' represents an incident angle when light enters a human eye through a left edge of the light-transmitting region of the m-th grating period, θ represents a refractive angle when light enters a human eye through the left edge of the light-transmitting region of the m-th grating period, θ1' represents an incident angle when light enters a human eye through a right edge of the light-transmitting region of the m-th grating period, θ1 represents an refractive angle when light enters a human eye through the right edge of the light-transmitting region of the m-th grating period, h represents a distance value between a first liquid crystal grating and a display panel, and H represents a distance value between a second liquid crystal grating and the display panel.

A difference between A' and A is an opening deviation value of an opening of the n-th grating period in the liquid crystal grating 1 and an opening of the n-th grating period in the liquid crystal grating 2.

A sum of the opening deviation values of the respective openings is an accumulated edge deviation, and each opening position has a different opening deviation; the general trend is that the opening of the second liquid crystal grating should be retracted relative to the opening of the first liquid crystal grating.

From the foregoing, in embodiments of the present disclosure, for a grating period in the liquid crystal grating, when the opening deviation reaches a width that is an integral multiple of a center-to-center spacing between adjacent second electrodes S21, one second electrode S21 is removed and this grating period is used as a second grating period S2. That is, a grating period S, in which the opening deviation of the second light-transmitting region S2T is an integral multiple of the center-to-center spacing between adjacent second electrodes S21, is used as the second grating period S2. Moreover, the second grating period S2 is driven separately by a second driving structure Z2, so as to reduce the opening deviation and relieve the problem of crosstalk in the 3D display device being viewed.

As can be seen from the foregoing, the opening deviation B satisfies a following relationship:

$$B = (x1' - x') - (x1 - x); \text{where, } x1' \text{ satisfies: } \tan\theta1' = x1' / H;$$

$$x' \text{ satisfies: } \tan\theta' = x' / H; x1 \text{ satisfies: } \tan\theta1 = x1 / h;$$

$$x \text{ satisfies: } \tan\theta = x / h.$$

Figure 5:
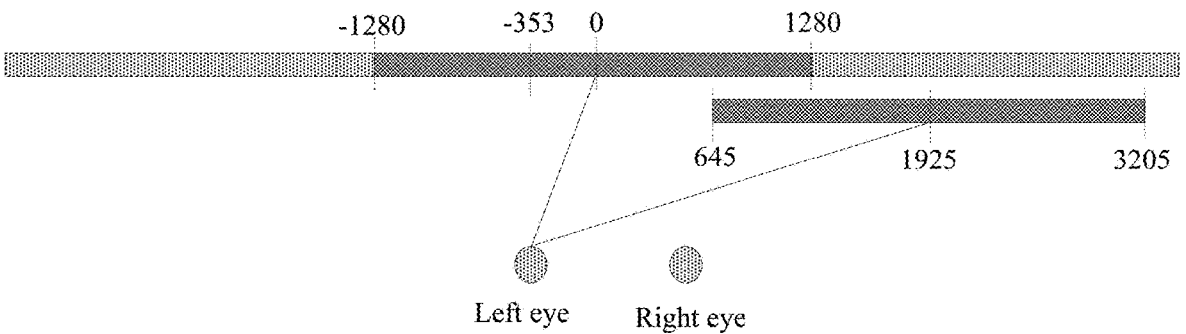
FIG. 5 is a schematic diagram of the arrangement of second grating periods at different positions according to embodiments of the present disclosure.

For example, when a center-to-center spacing between adjacent second electrodes S21 is 5 μm, as shown in FIG. 5, at a position of the 645th grating period S on the right side of the liquid crystal grating, a first opening position whose opening deviation is an integral multiple (5 μm) of the center-to-center spacing between the adjacent second electrodes S21 appears; at a position of the 1280th grating period S, a second opening position whose opening deviation is an integral multiple (10 μm) of the center-to-center spacing between the adjacent second electrodes S21 appears; at a position of the 1925th grating period S, a third opening position whose opening deviation is an integral multiple (15 μm) of the center-to-center spacing between the adjacent second electrodes S21 appears . . . the grating periods S at the positions where opening deviations are integral multiples (e.g., 1, 2, 3 . . . ) of the center-to-center spacing between the adjacent second electrodes S21 are each reduced by one second electrode S21, and among these grating periods at the integral multiple positions, those with the same serial number are connected.

In a possible implementation, as shown in FIG. 3, the first electrode S11 may also be located on the first substrate 11, and the second substrate 12 may also be provided with a third electrode 14. The third electrode 14 may be planar. By applying a voltage to the first electrode S11 and the third electrode 14, an electric field is formed between the first electrode S11 and the third electrode 14 to control the liquid crystal between the first electrode S11 and the third electrode 14 to deflect, so that the first grating period S1 correspondingly forms a first light-shielding region S1Z and a first light-transmitting region S1T. Likewise, by applying a voltage to the second electrode S21 and the third electrode 14, an electric field is formed between the second electrode S21 and the third electrode 14 to control the liquid crystal between the second electrode S21 and the third electrode 14 to deflect, so that the second grating period S2 correspondingly forms a second light-shielding region S2Z and a second light-transmitting region S2T.

In another possible implementation, the second electrode S21 may also be located on the second substrate 12, the first electrode S11 may also be located on the second substrate 12, and the third electrode 14 may be located on the first substrate 11. In another possible implementation, both of the first electrode S11 and the second electrode S21 may be located on the first substrate 11, or both of the first electrode S11 and the second electrode S21 may be located on the second substrate 12, or, one of the first electrode S11 and the second electrode S21 may be located on the first substrate 11 and the other one of the first electrode S11 and the second electrode S21 may be located on the second substrate 12.

In a possible implementation, the quantity of the first electrodes S11 in the first grating period S1 and the quantity of the second electrodes S21 in the second grating period S2 have a difference of 1.

In a possible implementation, referring to FIG. 6, a width of the first light-shielding region S1Z in the first direction X is same as a width of the second light-shielding region S2Z in the first direction X. For example, in the first grating period S1, the first light-shielding region S1Z has a width z=z1+z2, where z1 is the width of the first first electrode S11 from the left in the first grating period S1, and z2 is the sum of the width of the fifth first electrode S11 and the width of the sixth first electrode S11 in the first grating period S1. The second light-shielding region S2Z has a width z'=z3+z4, where z3 is the width of the first second electrode S21 from the left in the second grating period S2, z4 is the sum of the width of the fourth second electrode S21 and the width of the fifth second electrode S21 in the second grating period S2, that is, z=z'.

In a possible implementation, referring to FIG. 6, the first driving structure Z1 includes: a plurality of first driving lines Z11 extending along the first direction X, and first connecting lines Z12 electrically connected with the first electrodes S11 in the first grating period S1 in one-to-one correspondence; the first electrodes S11 at same positions in different first grating periods S1 are connected with a same first driving line Z11 through the first connecting lines Z12, and the first electrodes S11 at different positions in a same first grating period S1 are electrically connected with different first driving lines Z11 through the first connecting lines Z12. For example, as shown in FIG. 6, the first first electrode S11 in the first first grating period S1 from the left, and the first first electrode S11 in the second first grating period S1 from the left are electrically connected with the first first driving line Z11 in the top-to-down direction through the corresponding first connecting lines Z12; the second first electrode S11 in the first first grating period S1 from the left, and the second first electrode S11 in the second first grating period S1 from the left are electrically connected with the second first driving line Z11 in the top-to-down direction through the corresponding first connecting lines Z12; the third first electrode S11 in the first first grating period S1 from the left, and the third first electrode S11 in the second first grating period S1 from the left are electrically connected with the third first driving line Z11 in the top-to-down direction through the corresponding first connecting lines Z12; the fourth first electrode S11 in the first first grating period S1 from the left, and the fourth first electrode S11 in the second first grating period S1 from the left are electrically connected with the fourth first driving line Z11 in the top-to-down direction through the corresponding first connecting lines Z12; the fifth first electrode S11 in the first first grating period S1 from the left, and the fifth first electrode S11 in the second first grating period S1 from the left are electrically connected with the fifth first driving line Z11 in the top-to-down direction through the corresponding first connecting lines Z12; and the sixth first electrode S11 in the first first grating period S1 from the left, and the sixth first electrode S11 in the second first grating period S1 from the left are electrically connected with the sixth first driving line Z11 in the top-to-down direction through the corresponding first connecting lines Z12.

In a possible implementation, referring to FIG. 6, the second driving structure Z2 includes: a plurality of second driving lines Z21 extending along the first direction X, and second connecting lines Z22 electrically connected with the second electrodes S21 in the second grating period S2 in one-to-one correspondence; the second electrodes S21 at same positions in the second grating periods S2 are connected with a same second driving line Z21 through the second connecting lines Z22, and the second electrodes S21 at different positions in the second grating period S2 are connected with different second driving lines Z21 through the second connecting lines Z22. For example, as shown in FIG. 6, the first second electrode S21 in the first second grating period S2 from the left, and the first second electrode S21 in the second second grating period S2 from the left are electrically connected with the first second driving line Z21 in the top-to-down direction through the corresponding second connecting lines Z22; the second second electrode S21 in the first second grating period S2 from the left, and the second second electrode S21 in the second second grating period S2 from the left are electrically connected with the second second driving line Z21 in the top-to-down direction through the corresponding second connecting lines Z22; the third second electrode S21 in the first second grating period S2 from the left, and the third second electrode S21 in the second second grating period S2 from the left are electrically connected with the third second driving line Z21 in the top-to-down direction through the corresponding second connecting lines Z22; the fourth second electrode S21 in the first second grating period S2 from the left, and the fourth second electrode S21 in the second second grating period S2 from the left are electrically connected with the fourth second driving line Z21 in the top-to-down direction through the corresponding second connecting lines Z22; and the fifth second electrode S21 in the first second grating period S2 from the left, and the fifth second electrode S21 in the second second grating period S2 from the left are electrically connected with the fifth second driving line Z21 in the top-to-down direction through the corresponding second connecting lines Z22.

In a possible implementation, referring to FIG. 6, the first electrodes S11 have a same length in a direction perpendicular to the first direction X, and the second electrodes S21 have a same length in a direction perpendicular to the first direction X. A length of the second electrode S21 in a direction perpendicular to the first direction X is same as a length of the first electrode S11 in a direction perpendicular to the first direction X.

In a possible implementation, in a same first grating period S1, the first electrodes S11 may have different lengths in a direction perpendicular to the first direction X, the first connecting lines Z12 may not be provided and be replaced by the first electrodes S11, and the first electrodes S11 having different lengths may be electrically connected with the first driving lines Z11 directly. In a same second grating period S2, the second electrodes S21 may have different lengths in a direction perpendicular to the first direction X, the second connecting lines Z22 may not be provided and be replaced by the second electrodes S21, and the second electrodes S21 having different lengths may be electrically connected with the second driving lines Z21 directly.

In a possible implementation, referring to FIG. 6, the second connecting lines Z22 extend along a direction perpendicular to the first direction X. The first connecting lines Z12 extend along a direction perpendicular to the first direction X. The first driving lines Z11 extend along the first direction X, and the second driving lines Z21 extend along the first direction X.

In a possible implementation, the second connecting lines Z22 may be arranged on a same layer as the first connecting lines Z12, and the second driving lines Z21 may be arranged on a same layer as the first driving lines Z11.

In a possible implementation, the second connecting lines Z22 may be located on a different layer from the second driving lines Z21. The first connecting lines Z12 may be located on a different layer from the first driving lines Z11.

In a possible implementation, the second driving lines Z21 are located on a side of the first driving lines Z11 away from the second electrodes S21. In another possible implementation, the second driving lines Z21 and the first driving lines Z11 may also be located on different sides of the second electrodes S21. For example, the first driving lines Z11 are located on the lower side of the second electrodes S21, while the second driving lines Z21 are located on the upper side of the second electrodes S21.

In a possible implementation, the liquid crystal grating has a symmetry axis perpendicular to the first direction X, and two grating regions distributed on both sides of the symmetry axis; the liquid crystal grating has two second driving structures Z2 that control different grating regions respectively. That is, for example, the liquid crystal grating has a left grating region arranged on a left side of the symmetry axis, and a right grating region arranged on a right side of the symmetry axis. One of the second driving structures Z2 is used to drive the left grating region, and the other one of the second driving structures Z2 is used to drive the right grating region. The second driving structure Z2 that drives the left grating region and the second driving structure Z2 that drives the right grating region are independent from each other and may not be connected with each other.

Based on the same inventive concept, referring to FIG. 4, embodiments of the present disclosure further provide a display device, including a liquid crystal grating 1 according to embodiments of the present disclosure, and further including a display panel 2 on a light-emitting side of the liquid crystal grating 1. Those skilled in the art should understand that other essential components of the display device are further provided, which will not be repeated here, and which should not be used to limit the present disclosure. In addition, since the principle of the display device for solving the problem is similar to the principle of the above display panel for solving the problem, for the implementation of the display device, reference may be made to the implementation of the above liquid crystal grating, which will not be repeated herein.

The liquid crystal grating 1 may be disposed on a light-emitting side of the display panel 2, in which case the liquid crystal grating 1 may be called a front grating; or the liquid crystal grating 1 may be disposed on a backlight side of the display panel 2, in which case the liquid crystal grating 1 may be called a rear grating, which will not be limited here.

Based on the same inventive concept, referring to FIG. 7, embodiments of the present disclosure further provide a control method for controlling the liquid crystal grating according to embodiments of the present disclosure, including following steps.

Step S100: applying, by the first driving structure, the voltages to the first electrodes in the first grating period, so that the first grating period forms the first light-shielding region and the first light-transmitting region.

Step S200: applying, by the second driving structure, the voltages to the second electrodes in the second grating period, so that the second grating period forms the second light-shielding region and the second light-transmitting region, and the width of the second light-transmitting region in the first direction is less than the width of the first light-transmitting region in the first direction.

In embodiments of the present disclosure, the liquid crystal grating S includes a plurality of first grating periods S1, a first driving structure Z1 that drives the first grating periods S1, a plurality of second grating periods S2, and a second driving structure Z2 that drives the second grating periods S2. The quantity of the second electrodes S21 in the second grating period S2 is less than the quantity of the first electrodes S11 in the first grating period S1. By making a width t2 of the second light-transmitting region S2T in the first direction X less than a width t1 of the first light-transmitting region S1T in the first direction X, that is, narrowing the opening of the second grating period S2, an accumulated opening deviation at the second grating period S2 of the liquid crystal grating is thus reduced, the opening of the second grating period S2 is compensated, and an accumulated edge deviation of the opening of the liquid crystal grating is reduced, relieving the problem of a gradual increase in crosstalk from the center to the edge of the grating.

It should be noted that, the relationship terms used herein, such as "first," "second," and the like are only used to distinguish one entity or operation from another entity or operation, but do not necessarily require or imply that there is actual relationship or order between these entities or operations.

Although embodiments of the present disclosure have been described, those skilled in the art will be able to make additional changes and modifications to these embodiments once the basic inventive concepts are apparent. Therefore, it is intended that the appended claims be construed to include embodiments and all changes and modifications that fall within the scope of the disclosure.

Evidently those skilled in the art can make various modifications and variations to embodiments of the present disclosure without departing from the spirit and scope of the present disclosure. Thus the present disclosure is also intended to encompass these modifications and variations therein as long as these modifications and variations to the present disclosure come into the scope of the claims of the present disclosure and their equivalents.

What is claimed is:

1. A liquid crystal grating, comprising:

a plurality of grating periods, comprising a first grating period and a second grating period arranged along a first direction, wherein the first grating period comprises a plurality of first electrodes arranged along the first direction, the second grating period comprises a plurality of second electrodes arranged along the first direction, wherein a quantity of the second electrodes in the second grating period is less than a quantity of the first electrodes in the first grating period;

a first driving structure, electrically connected with the first electrodes, and controlling the first grating period to form a first light-shielding region and a first light-transmitting region by applying voltages to the first electrodes; and a second driving structure, electrically connected with the second electrodes, and controlling the second grating period to form a second light-shielding region and a second light-transmitting region by applying voltages to the second electrodes, wherein a width of the second light-transmitting region in the first direction is less than a width of the first light-transmitting region in the first direction;

wherein the first driving structure comprises: a plurality of first driving lines extending along the first direction, and first connecting lines electrically connected with the first electrodes in the first grating period in one-to-one correspondence; the first electrodes at same positions in different first grating periods are connected with a same first driving line through the first connecting lines, and the first electrodes at different positions in a same first grating period are electrically connected with different first driving lines through the first connecting lines.

2. The liquid crystal grating according to claim 1, wherein each of the grating periods comprises a first substrate and a second substrate arranged opposite to each other, and a liquid crystal layer between the first substrate and the second substrate, the second electrode is located on the first substrate; a width of the first electrode in the first direction is equal to a width of the second electrode in the first direction; and an opening deviation of the second light-transmitting region is an integer multiple of a center-to-center spacing between adjacent second electrodes.

3. The liquid crystal grating according to claim 2, wherein the opening deviation B satisfies a following relationship:

$$B = (x1' - x') - (x1 - x); \text{ where, } x1' \text{ satisfies: } \tan\theta1' = x1'/H;$$

$$x' \text{ satisfies: } \tan\theta' = x'/H; x1 \text{ satisfies: } \tan\theta1 = x1/h;$$

$$x \text{ satisfies: } \tan\theta = x/h;$$

θ' represents an incident angle when light enters a human eye through a left edge of the light-transmitting region of the m-th grating period, θ represents a refractive angle when light enters a human eye through the left edge of the light-transmitting region of the m-th grating period, θ1' represents an incident angle when light enters a human eye through a right edge of the light-transmitting region of the m-th grating period, $\theta 1$ represents an refractive angle when light enters a human eye through the right edge of the light-transmitting region of the m-th grating period, h represents a distance value between a first liquid crystal grating and a display panel, and H represents a distance value between a second liquid crystal grating and the display panel wherein based on that no refractive medium layer is between the display panel and the liquid crystal layer of the liquid crystal grating, the liquid crystal grating is the first liquid crystal grating; and based on that a refractive medium layer is between the display panel and the liquid crystal layer of the liquid crystal grating, the liquid crystal grating is the second liquid crystal grating.

4. The liquid crystal grating according to claim 1, wherein the quantity of the first electrodes in the first grating period and the quantity of the second electrodes in the second grating period have a difference of 1.

5. The liquid crystal grating according to claim 4, wherein a width of the first light-shielding region in the first direction is same as a width of the second light-shielding region in the first direction.

6. The liquid crystal grating according to claim 1, wherein the second driving structure comprises: a plurality of second driving lines extending along the first direction, and second connecting lines electrically connected with the second electrodes in the second grating period in one-to-one correspondence; the second electrodes at same positions in the second grating periods are connected with a same second driving line through the second connecting lines, and the second electrodes at different positions in the second grating period are connected with different second driving lines through the second connecting lines.

7. The liquid crystal grating according to claim 6, wherein the second connecting lines extend along a direction perpendicular to the first direction.

8. The liquid crystal grating according to claim 6, wherein the second connecting lines are arranged on a same layer as the first connecting lines, and the second driving lines are arranged on a same layer as the first driving lines.

9. The liquid crystal grating according to claim 6, wherein the second connecting lines are located on a different layer from the second driving lines.

10. The liquid crystal grating according to claim 6, wherein the second driving lines are located on a side of the first driving lines away from the second electrodes.

11. The liquid crystal grating according to claim 1, wherein the liquid crystal grating has a symmetry axis perpendicular to the first direction, and two grating regions distributed on both sides of the symmetry axis; and the liquid crystal grating has two second driving structures that control different grating regions respectively.

12. A display device, comprising the liquid crystal grating according to claim 1, and further comprising a display panel on a light-emitting side of the liquid crystal grating.

13. A control method for controlling the liquid crystal grating according to claim 1, comprising:

applying, by the first driving structure, the voltages to the first electrodes in the first grating period, so that the first grating period forms the first light-shielding region and the first light-transmitting region; and applying, by the second driving structure, the voltages to the second electrodes in the second grating period, so that the second grating period forms the second light-shielding region and the second light-transmitting region, and the width of the second light-transmitting region in the first direction is less than the width of the first light-transmitting region in the first direction.

\* \* \* \* \*